US012683141B2

(12) United States Patent
Ugarov

(10) Patent No.: US 12,683,141 B2
(45) Date of Patent: Jul. 14, 2026

(54) SYSTEMS AND TECHNIQUES FOR IN-SOURCE ION SEPARATION

(71) Applicant: THERMO FINNIGAN LLC, San Jose, CA (US)

(72) Inventor: Mikhail V. Ugarov, San Jose, CA (US)

(73) Assignee: THERMO FINNIGAN LLC, San Jose, CA (US)

( * ) Notice: Subject to any disclaimer, the term of this patent is extended or adjusted under 35 U.S.C. 154(b) by 434 days.

(21) Appl. No.: 18/148,313

(22) Filed: Dec. 29, 2022

(65) Prior Publication Data

US 2024/0222105 A1 Jul. 4, 2024

(51) Int. Cl.

| | |
|---|---|
| ***H01J 49/28*** | (2006.01) |
| ***H01J 49/02*** | (2006.01) |
| ***H01J 49/04*** | (2006.01) |
| ***H01J 49/16*** | (2006.01) |

(52) U.S. Cl.

CPC .......... *H01J 49/282* (2013.01); *H01J 49/022* (2013.01); *H01J 49/0422* (2013.01); *H01J 49/165* (2013.01)

(58) Field of Classification Search

None

See application file for complete search history.

(56) References Cited

U.S. PATENT DOCUMENTS

| | | | | |
|---|---|---|---|---|
| 2,683,811 A * | 7/1954 | Robinson | H01J 49/022 | 250/295 |
| 2,945,126 A * | 7/1960 | Brubaker | H01J 49/022 | 250/296 |
| 7,026,612 B2 * | 4/2006 | Guevremont | H01J 49/04 | 250/281 |
| 8,242,440 B2 * | 8/2012 | Splendore | H01J 49/0404 | 250/288 |

(Continued)

FOREIGN PATENT DOCUMENTS

| | | | |
|---|---|---|---|
| KR | 101819534 B1 * | 3/2018 | H01J 49/10 |
| WO | WO-2010041010 A1 * | 4/2010 | H01J 49/0013 |

OTHER PUBLICATIONS

Menlyadiev et al. ("Low-mobility-pass filter between atmospheric pressure chemical ionization and electrospray ionization sources and a single quadrupole mass spectrometer: computational models and measurements") (Year: 2013).*

(Continued)

*Primary Examiner* — David E Smith
*Assistant Examiner* — Alina Kaliszewski
(74) *Attorney, Agent, or Firm* — Leron Vandsburger

(57) ABSTRACT

Systems, devices, and methods for in-source ion separation are provided. An ion separator includes an ion transfer conduit fluidically upstream of and coupled with one or more components of an analytical instrument. The ion separator includes a gas conduit, fluidically upstream of and coupled with the ion transfer conduit, the gas conduit defining an internal volume. The ion separator also includes (Continued)

electronic circuitry defining an active surface exposed to the internal volume, the electronic circuitry being configured to energize the active surface. Embodiments of the present disclosure provide improved analysis of material samples based at least in part on in-source separation of relatively light ions from relatively heavy ions entrained in a gas flow.

17 Claims, 9 Drawing Sheets

(56) References Cited

U.S. PATENT DOCUMENTS 8,461,524 B2 * 6/2013 Dunyach ................. H01J 49/24 250/281
8,785,847 B2 * 7/2014 Kovtoun ............... H01J 49/063 250/283
8,952,326 B1 * 2/2015 Ugarov ............... H01J 49/0404 250/281
2003/0146377 A1 * 8/2003 Miller ................. H01J 49/0018 250/288
2006/0151694 A1 * 7/2006 Guevremont ........ G01N 27/624 250/291
2009/0134321 A1 * 5/2009 Hoyes ................... H01J 49/004 250/281
2012/0160997 A1 * 6/2012 Fink ........................ H01J 49/10 250/288
2014/0000341 A1 * 1/2014 McCauley ......... G01N 30/7206 73/23.37
2014/0054457 A1 * 2/2014 Steiner .................... H01J 49/42 250/290
2014/0158904 A1 * 6/2014 Prasad ................. G01N 27/624 250/428
2015/0097115 A1 * 4/2015 Schwartz ............ H01J 49/4215 250/283
2019/0371591 A1 * 12/2019 Taghioskoui ......... H01J 49/063
2022/0093381 A1 * 3/2022 Nieto Ramos ........ H01J 49/066
2022/0299473 A1 * 9/2022 Park ........................ H01J 49/10
2023/0314372 A1 * 10/2023 Ugarov ................ G01N 27/623 324/464
2024/0345040 A1 * 10/2024 Grosse Bley .......... G01N 27/64

OTHER PUBLICATIONS

English machine translation for KR-101819534-B1 (Year: 2018).*

Sysoev, A. et al. (2004), Development of an ion mobility spectrometer for use in an atmospheric pressure ionization ion mobility spectrometer/mass spectrometer instrument for fast screening analysis. Rapid Commun. Mass Spectrom., 18: 3131-3139. https://doi.org/10.1002/rcm.1738 (Year: 2004).*

Menlyadiev et al. "Low-mobility-pass filter between atmospheric pressure chemical ionization and electrospray ionization sources and a singlt quadrupole mass spectrometer: computation models and measurements" Rapid Communications in Mass Spectrometry, vol. 28, No. 1, Nov. 28, 2013, pp. 135-142.

Kang et al. "Depth dependent carrier density profile by scanning capacitance microscopy" Applied Physics Letters, Sep. 15, 1997, vol. 71, No. 11, pp. 1546-1548.

Kopanski et al. "Comparison of measured and modeled scanning capacitance microscopy images across p-n junctions," AIP Conference Proceedings, 1998, No. 449, pp. 725-729.

* cited by examiner

SYSTEMS AND TECHNIQUES FOR IN-SOURCE ION SEPARATION

TECHNICAL FIELD

Embodiments of the present disclosure are directed to analytical instrument components, systems, and methods. In particular, some embodiments are directed toward ion sources including in-source ion separators.

BACKGROUND

Chemical analysis of samples using a mass spectrometer, as for elemental composition and/or chemical structure, includes generating streams of ions that are conducted to a detector via an ion transfer section. Inductively coupled plasma mass spectrometry (ICP-MS), for example, at least partially dissociates a sample in a nonthermal plasma to generate ionized species that can be affected by electric fields. Interaction between the ions and electrostatic elements of the detector generates different types of detectable signals that can be used for compositional analysis. In a mass spectrometer (MS) instrument, detailed information can be developed for elemental composition, molecular structure, and other characteristics of the samples (e.g., oxidation state, etc.).

MS instruments typically ionize a sample and measure the ratio of mass and charge of the ions produced. A mass spectrum describes intensity of a detector signal as a function of mass-to-charge (M/Z) ratio. Constituent species are identified by comparing parent ion mass values and decomposition signatures that can be characteristic of specific elements and molecular structures. Phenomena including clustering, space charge capacity limitations, and saturation of trapping devices by relatively light ions, each represent significant challenges to detection, quantification, and other analyses using MS instruments. In an illustrative example, solvents and/or lighter species can carry a significant portion of charge and can saturate a detector or can reduce transmission through trapping devices overall. As such, there is a need to develop components, systems, and methods to selectively attenuate the signature of solvents and other materials in favor of emphasizing signals corresponding to species and/or elements of interest.

SUMMARY

In one aspect, an ion separator for in-source ion separation, includes an ion transfer conduit fluidically upstream of and coupled with one or more components of an analytical instrument, a gas conduit, fluidically upstream of and coupled with the ion transfer conduit, the gas conduit defining an internal volume, and electronic circuitry defining an active surface exposed to the internal volume, the electronic circuitry being configured to energize the active surface.

The ion separator can also include further includes an electronically insulating standoff, disposed between the active surface and the gas conduit, where at least part of the electronic circuitry is mechanically coupled with the gas conduit via the insulating standoff, and where the gas conduit defines an aperture fluidically coupling the internal volume with the active surface.

The active surface can be disposed in or on an internal surface of the gas conduit.

The electronic circuitry can include a conductive element disposed in the internal volume, the active surface being defined by an outer surface of the conductive element.

The electronic circuitry can be configured to energize the active surface to a voltage having a magnitude from about 10 V to about 1000 V.

The gas conduit can be characterized by a higher gas conductance relative to the ion transfer conduit.

The ion separator can be configured to generate a gas velocity through the gas conduit from about 1 m/s to about 50 m/s.

The gas conduit can open onto a first environment configured to operate at a first pressure, and the ion transfer conduit can open onto a second environment configured to operate at a second pressure lower than the first pressure, the second environment being fluidically coupled with the first environment via the gas conduit and the ion transfer conduit.

In another aspect, an analytical instrument includes an ion source configured to generate a stream of ionized sample material, a gas conduit, fluidically coupled with the ion source and oriented to receive the stream of ionized sample material from the ion source, the gas conduit defining an internal volume, electronic circuitry defining an active surface exposed to the internal volume, the electronic circuitry being configured to energize the active surface, an ion transfer conduit downstream of and fluidically coupled with the ion source via the gas conduit, and one or more components of the analytical instrument configured to receive ions of the stream of ionized sample material and to generate spectrometric data characteristic of the ionized sample material.

The analytical instrument can further include an electronically insulating standoff, disposed between the active surface and the gas conduit, where at least part of the electronic circuitry is mechanically coupled with the gas conduit via the insulating standoff, and where the gas conduit defines an aperture fluidically coupling the internal volume with the active surface.

The electronic circuitry can include a shared voltage source electronically coupled with the active surface and with the ion source.

The ion source and the gas conduit can be disposed in a first environment, the ion transfer conduit can be disposed in a second environment, the analytical instrument can be configured to maintain a first pressure of the first environment substantially equal to atmospheric pressure, and the analytical instrument can be configured to maintain a second pressure of the second environment lower than the first pressure.

The analytical instrument can be configured to generate a gas velocity through the gas conduit from about 1 m/s to about 50 m/s.

The aperture can be a first aperture, where the first aperture is proximal to a first region of the active surface, and the gas conduit can define a second aperture fluidically coupling the internal volume with a second region of the active surface. The first aperture and the second aperture can be formed in opposing sides of the gas conduit.

The active surface can be a first active surface, and the electronic circuitry can define a second active surface disposed in or on the internal surface of the gas conduit.

The conductive element can be substantially aligned with a central axis of the gas conduit and the ion transfer conduit.

In yet another aspect, embodiments of the present disclosure include methods and processes for using the ion separator and/or the analytical instrument of the preceding aspects for in-source ion separation. For example, aspects of the present disclosure can be used to attenuate space-charge saturation attributable to a solvent or other relatively light species, thereby improving the signal-to-background and/or signal-to-noise characteristics of a species of interest. The processes of the present disclosure include energizing the ion separator, atomizing and/or vaporizing a sample (e.g., via electrospraying, nebulizing, sublimating, vaporizing, desorbing, etc.), and flowing the sample through the ion separator.

Other technical features can be readily apparent to one skilled in the art from the following figures, descriptions, and claims. The terms and expressions which have been employed are used as terms of description and not of limitation, and there is no intention in the use of such terms and expressions of excluding any equivalents of the features shown and described or portions thereof, but it is recognized that various modifications are possible within the scope of the claimed subject matter. Thus, it should be understood that although the present claimed subject matter has been specifically disclosed by embodiments and optional features, modification and variation of the concepts herein disclosed can be resorted to by those skilled in the art, and that such modifications and variations are considered to be within the scope of this disclosure as defined by the appended claims.

BRIEF DESCRIPTION OF THE DRAWINGS

The foregoing aspects and many of the attendant advantages of the present disclosure will become more readily appreciated as the same become better understood by reference to the following detailed description, when taken in conjunction with the accompanying drawings.

Figure 1:
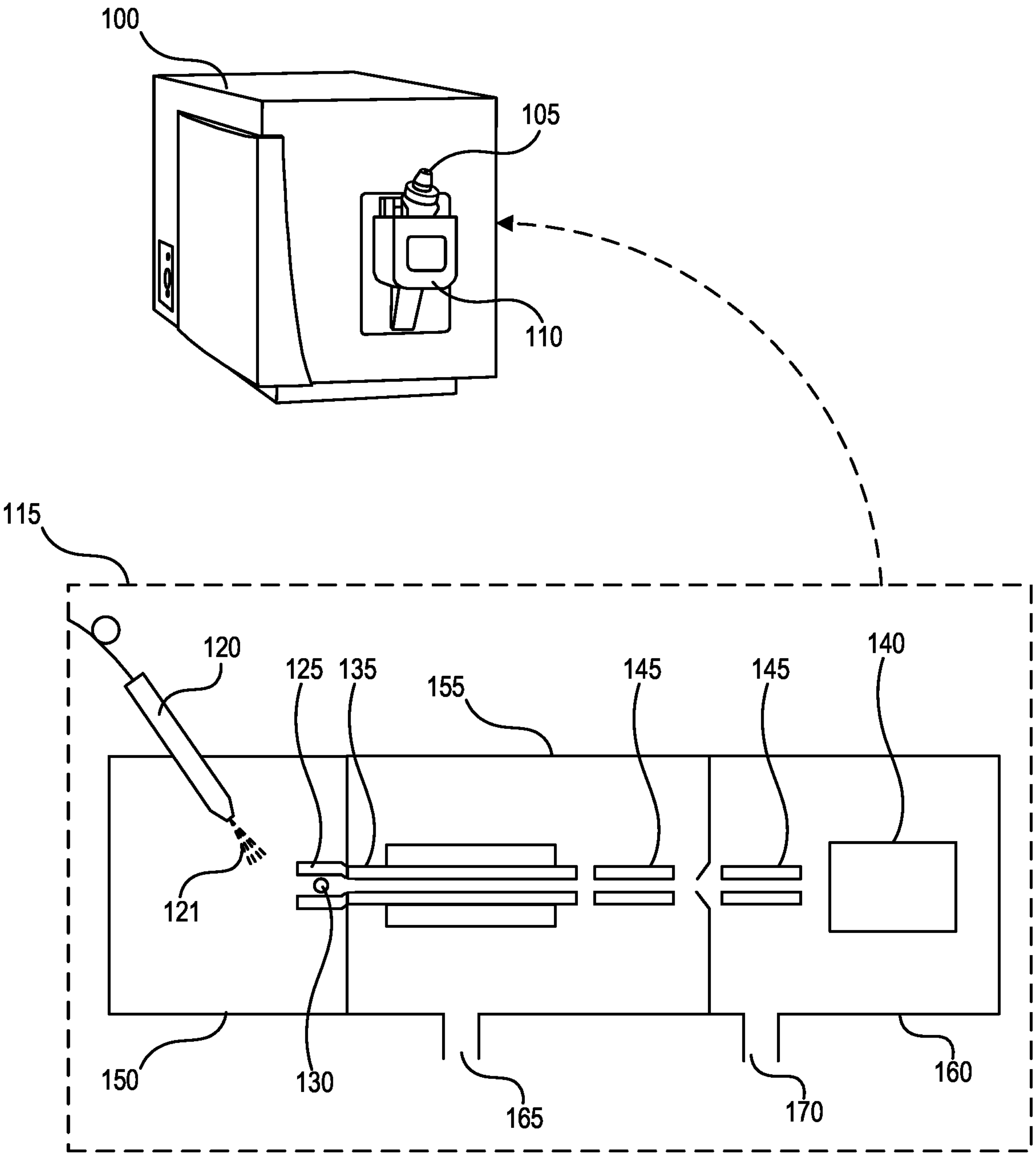
FIG. 1 is a schematic diagram illustrating a mass spectrometer (MS) system, in accordance with some embodiments of the present disclosure.

In the drawings, like reference numerals refer to like parts throughout the various views unless otherwise specified. Not all instances of an element are necessarily labeled to reduce clutter in the drawings where appropriate. The drawings are not necessarily to scale, emphasis instead being placed upon illustrating the principles being described.

DETAILED DESCRIPTION

While illustrative embodiments have been illustrated and described, it will be appreciated that various changes can be made therein without departing from the spirit and scope of the disclosure. In the forthcoming paragraphs, embodiments of an analytical instrument system, components, and methods to selectively attenuate signals attributable to solvents and other material and to reduce resulting saturation of ion detectors. Embodiments of the present disclosure focus on mass spectrometry and related instruments in the interest of simplicity of description. To that end, embodiments are not limited to such instruments, but rather are contemplated for analytical instrument systems where analysis can be complicated by the relative dominance of characteristic signals originating from solvent or other relatively light species and/or elements. In an illustrative example, analytical techniques that include atomization and ionization of liquid samples can benefit from selective attenuation of solvent composition in the ionized vapor. Similarly, while embodiments of the present disclosure focus on electrospray ionizers to generate an atomized plume of ions from a liquid sample, additional and/or alternative ionization modalities are contemplated, including but not limited to non-thermal plasma ionizers (e.g., ICP nebulizer sources), matrix assisted laser desorption ionization (MALDI), and/or desorption electrospray ionization (DESI) techniques.

Chemical analysis of samples using a mass spectrometer, as for elemental composition and/or chemical structure, includes generating streams of ions that are conducted to a detector via an ion transfer section. Inductively coupled plasma mass spectrometry (ICP-MS), for example, at least partially dissociates a sample in a nonthermal plasma to generate ionized species that can be affected by electric fields. Interaction between the ions and electrostatic elements of the detector generates different types of detectable signals that can be used for compositional analysis. In a mass spectrometer (MS) instrument, detailed information can be developed for elemental composition, molecular structure, and other characteristics of the samples (e.g., oxidation state, etc.).

Electrospray ion sources for MS instruments produce ion currents up to about $10^{10}$ ions/sec. For samples suspended in a solvent, a significant portion of charge imparted to the samples can be carried by the solvent and/or solvent cluster ions, as opposed to heavier species. As a result, challenges for identification and/or quantification of relatively heavy species can arise based at least in part on space charge effects, which can lead to reduced transmission of heavier species through MS instruments. Similarly, clusters of relative low m/z ions can contribute to noise in mass spectra, such as in circumstances where clustering/de-clustering processes occur in relatively high-pressure sections of the mass spectrometer. Another potential challenge encountered when MS instruments operate with relatively high ion currents derives from the fact that trapping devices downstream of the source can be limited in space charge capacity. Examples of trapping devices include analytical ion traps and other trapping devices, such as those used for pre-separation of ions. Techniques to reduce overall ion current while also selectively attenuating relatively light ion current can increase trapping time for a given MS instrument which typically leads to higher sensitivity and throughput of the analysis.

Several approaches known in the art can be used to reduce the effects of high currents carried by various charged species. Some techniques employ radio frequency (RF) ion guides to destabilize the trajectories of relatively light ions at least in part by applying a high-intensity RF field or through exposing the ions to imbalanced DC potentials. Disadvantageously, such approaches are applicable only at relatively low pressure after significant ion filtration has occurred. Moreover, ions lost in RF devices can land on active optics surfaces, resulting in contamination of internal active surfaces, charging effects that impair functioning of components, and performance degradation of the MS instrument overall.

An RF separation device, for example based on field asymmetric ion mobility spectroscopy (FAIMS), can be used in a source region of an MS instrument as an approach to selectively removing ions from a stream of ions based on differential mobility. Success of such approaches is limited by their complexity, and typically include significant losses of target ions. For at least these reasons, there remains a need for in-source pre-separation of ions to selectively remove relatively smaller m/z species and reduce overall ion current with negligible or no impact on flux of relatively larger m/z species of analytical interest. In contrast to RF techniques, embodiments of the present disclosure can be effective at atmospheric pressure and can be extended into lower pressure sections of analytical instruments.

To that end, embodiments of the present disclosure include an in-source ion separator. The ion separator can include one or more component(s) of an analytical instrument that fluidically couple an source section of the analytical instrument with a sensor section of the analytical instrument, as would be understood by a person having ordinary skill in the art of mass spectrometry and related analytical techniques. To attenuate the signature of light elements, solvents, or the like, in favor of heavier species of analytical interest, the ion separator can include a gas conduit that defines an internal volume and electronic circuitry defining an active surface exposed to the internal volume. The active surface can be configured to emanate an electric field (e.g., an electrostatic field) when energized. In this way, the active surface can be configured to act as a collector of relatively light ions, selectively removing solvent and other lighter species from the entrained flow conducted from an ion source through to the detector.

FIG. 1 is a schematic diagram illustrating an example mass spectrometer (MS) system 100, in accordance with some embodiments of the present disclosure. The example MS system 100 is an example of an analytical instrument that is configured in line with the present disclosure to attenuate the signature of solvent and other relatively light species and/or elements. The example MS system 100 includes a sample input port 105, a sample processing module 110, and internal components 115. The internal components include an ion source 120, a gas conduit 125, an active surface 130, an ion transfer conduit 135, a detector module 140, and one or more electromagnetic elements 145.

The internal components 115 of the example MS system 100 can be divided into one or more sections, corresponding to different operating pressures. For example, Example MS system 100 includes a source section 150, an intermediate section 155, and a detector section 160. Intermediate section 155 is fluidically coupled with a first vacuum system via a first vacuum conduit 165 and the detector section 160 is fluidically coupled with a second vacuum system via a second vacuum conduit 170. Through induction of a pressure difference between the sections 150, 155, and 160, streams of ions can be conducted through the gas conduit 125 and past the active surface 130, toward the ion transfer conduit 135 and the detector module 140. The internal components 115 of the example MS system 100 are illustrated in cross-section along a plane aligned with a general flow direction from the source section 150 to the detector section 160 (e.g., aligned with a flow of ions from the ion source 120 to the detector module 140).

The ion source 120 is illustrated as an electrospray source, by which a liquid sample, such as a trace material suspended in a solvent (e.g., polar, non-polar, etc.), can be atomized and ionized through introduction via a nozzle maintained at a voltage on the order of about 1 kV to about 10 kV relative to a reference electrode. The combined action of pressure-driven flow and electrostatic acceleration, the liquid sample flows through the nozzle and enters the source section 150, thereby accelerating and ionizing the liquid and generating a stream of ions 121 in the direction of the gas conduit 125. Entrainment in a gas flow and/or pressure driven flow can draw the stream of ions 121 from the source section 150 toward the intermediate section 155, via the gas conduit 125 and the ion transfer conduit 135. In this way, the active surface 130 can be used to generate an electric field of opposite polarity to that of the stream of ions 121, as described in more detail in reference to FIGS. 2A-2D.

Figure 2A:
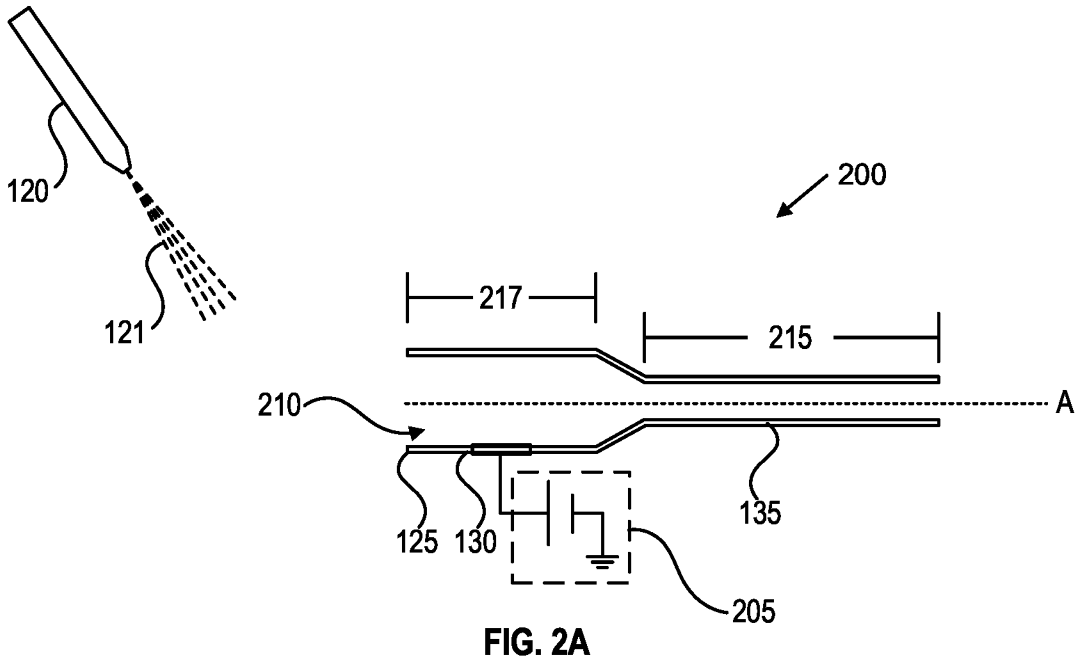
FIG. 2A is a schematic diagram illustrating an example ion separator, in accordance with some embodiments of the present disclosure.

FIG. 2A is a schematic diagram illustrating an example ion separator 200, in accordance with some embodiments of the present disclosure. The example ion separator 200 is an example of an internal component of an analytical instrument, such as an internal component 115 the example MS system 100 of FIG. 1. In this way, the example ion separator 200 includes a gas conduit 125, an ion transfer conduit 135, and electronic circuitry 205. The electronic circuitry can define the active surface 130, and can be configured to energize the active surface 130 (e.g., by applying an electrical bias to the active surface 130). electrically coupled with the active surface 130. The gas conduit 125 can define an internal volume 210. The internal volume 210 can be fluidically coupled with the ion transfer conduit 135. The internal volume 210 can be fluidically coupled with the source section 150 of the example MS system 100. In this way, the stream of ions 121 generated in the source section 150 can be conducts to the downstream sections 155-160 via the gas conduit 125 through the internal volume 210, being exposed to the active surface 130.

In some embodiments, at least a portion of the internal components 115, such as the gas conduit 125 and the ion transfer conduit 135, are rotationally symmetrical or otherwise symmetrical about a flow axis A substantially aligned with the average flow direction of ions through the gas conduit 125 and the ion transfer conduit 135. In this way, disposing the active surface 130 on one side of the gas conduit 125, exposed to the internal volume 210, permits the exposure of the ions to an electric field (e.g., an electrostatic field) emanating from the active surface, as described in more detail in reference to FIGS. 3A-4C. Illustrated in section, the active surface can be or include an electrically conductive material (e.g., a metal or conductive nonmetal) that can be disposed as an insert, a film, a patterned layer, or the like, in and/or on an internal surface of the gas conduit 125. In the example ion separator 200 of FIG. 2A, the active surface includes an electrically conductive material that is incorporated into the gas conduit 125 as an insert and the active surface serves as part of the gas conduit 125 through which ions flow toward the detector module 140. While being shown as an insert, active surface 130 can similarly be formed from an electrically conductive inlay, being set into a recess in the gas conduit 125 and being electrically coupled with other components of the electronic circuitry 205 (e.g., voltage source, etc.) via a through-hole formed in the gas conduit 125.

The electronic circuitry 205 is electrically coupled with the active surface 130, as shown, and configured to apply an electrical bias to the active surface 130. In this way, the magnitude of the electrical bias can determine the separation force applied to ions flowing in the internal volume 210, based at least in part on the mass-to-charge properties (M/Z) of the mixture of ions. In an illustrative example, the stream of ions 121 can include a mixture of solvent ions, being relatively light, and target ions, being relatively heavy. As part of ion separation, the electrical bias can be applied such that the force applied to ions flowing through the gas conduit, being exposed to the electric field emanating from the energized active surface, is strong enough to redirect lighter ions, with substantially less effect (e.g., negligible or no redirection) on relatively heavy ions, as described in more detail in reference to FIGS. 3A-51B. To that end, the electronic circuitry 205 can be configured to energize the active surface 130 to a voltage having a magnitude from about 10 V to about 2000 V, including sub-ranges, fractions, and interpolations thereof. As described in more detail in reference to FIGS. 4A-5B, separation of ions measured by transmission percentage or as measured in mass spectra reflect the influence of the magnitude of the applied voltage on the performance of the example ion separators of the present disclosure. Separation efficiency improves with increasing magnitude up to a point where the strength of the electric field attracts all ions in the flow eliminating separation instead of a specific subset (e.g., below a given M/Z ratio). In some embodiments, the ion source 120 is biased relative to the active surface 130, such that the stream of ions 121 is accelerated toward the gas conduit 125. For example, an electrospray ion source 120 can be biased on the order of 1 kV relative to ground, or about 1.6 kV relative to a bias of magnitude equal to about 600 V applied to the active surface 130. Furthermore, the gas conduit 125 can be grounded or floating and the active surface 130 can be biased.

In some embodiments, the applied voltage is configured based at least in part on the composition of the sample, rather than using a fixed value. For example, the electronic circuitry 205 can be configured to measure a current drawn from the active surface 130 by ion flux incident onto the active surface 130. Based at least in part on the distribution of current as a function of applied voltage, the magnitude of the applied voltage can be determined. In an illustrative example, the electronic circuitry 205 can be configured to progressively increase the magnitude of the applied voltage (e.g., with polarity opposite to the expected charge of the stream of ions 121) and generate data for current as a function of voltage. As lighter ions will be collected at lower applied voltages, the current data can foreseeably include two or more plateaus (for a steady flow of ions through the gas conduit 125), with plateaus at lower voltages corresponding to lighter ions and plateaus at higher voltages corresponding to heavier ions. In this way, the voltages at which lighter ions are collected selectively can be identified.

The ion transfer conduit 135 is characterized by a length 215 along the flow axis A. The length 215 can be from about 0.1 mm to about 10 cm. As such, the ion transfer conduit 135 can be configured as an orifice, illustrated in FIG. 2B, or as an ion transfer tube, through which ions can flow after being exposed to electric fields emanating from the active surface 130. Advantageously, flow properties of the example ion separator 200 can be configured to facilitate ion separation in the gas conduit 125, based at least in part on a relative difference in gas conductance between the ion transfer conduit 135 and the gas conduit 125.

In an illustrative example, where the conductance of the gas conduit 125 is higher than the conductance of the ion transfer conduit 135, for a substantially consistent volumetric flowrate, the linear velocity of ions in the gas conduit 125 can be lower than in the ion transfer conduit 135, permitting a lower electric field strength to be used to separate ions, reducing the likelihood of forming a corona discharge or other electrical and/or chemical phenomena that can impair the functioning and/or accuracy of the analytical instrument. To that end, the diameter of the gas conduit 125, the diameter of the ion transfer conduit 135, for circular conduits, and the length 215 of the ion transfer conduit 135 and a length 217 of the gas conduit 125 can be configured to facilitate ion separation in the source section 150. For example, the gas conduit 125 can be characterized by a diameter from about 1 mm to about 20 mm, including sub-ranges, fractions, and interpolations thereof. In some embodiments, the gas conduit 125 has a diameter from about 2 mm to about 10 mm. Similarly, the gas conduit 125 can be characterized by a length in a direction substantially aligned with the axis A from about 1 mm to about 50 mm, including sub-ranges, fractions, and interpolations thereof. In some embodiments, the gas conduit 125 has a length from about 5 mm to about 40 mm.

By contrast, the ion transfer conduit 135 can be characterized by a diameter from about 0.1 mm to about 10 mm, including sub-ranges, fractions, and interpolations thereof. In some embodiments, the ion transfer conduit 135 has a diameter from about 0.3 mm to about 2 mm. The ion transfer conduit 135 can be characterized by a length in a direction substantially aligned with the axis A from about 1 mm to about 300 mm, including sub-ranges, fractions, and interpolations thereof. In some embodiments, the ion transfer conduit 135 has a length from about 30 mm to about 200 mm. The dimensions of the gas conduit 125 and the ion transfer conduit 135 can be related via the constraint that a gas conductance through the gas conduit 125 can be larger than a gas conductance through the ion transfer conduit 135. Advantageously, a relatively higher gas conductance of the gas conduit 125 permits a relatively lower linear velocity for a given volumetric flow of ions through the ion separator. To that end, embodiments of the present disclosure having a narrower gas conduit 125 can also include a narrower ion transfer conduit 135. Conversely, embodiments of the present disclosure having a wider gas conduit 125 can also include a wider ion transfer conduit 135.

To that end, ion separators of the present disclosure (e.g., example ion separator 200) can be configured to generate a gas velocity through the gas conduit 125 from about 1 m/s to about 50 m/s, including sub-ranges, fractions, and interpolations thereof. Gas velocity can be correlated to an average residence time of ions in the internal volume 210, which, in turn, can be correlated to separation efficiency via the magnitude of the applied voltage, described above. In this way, a higher gas velocity can improve throughput and reduce latency of measurements, at the cost of increased voltage to facilitate a faster ion separation (with increased risk of gas discharge formation and chemical reaction). Similarly, a lower gas velocity can impair throughput and increase latency of measurements.

Figure 2B:
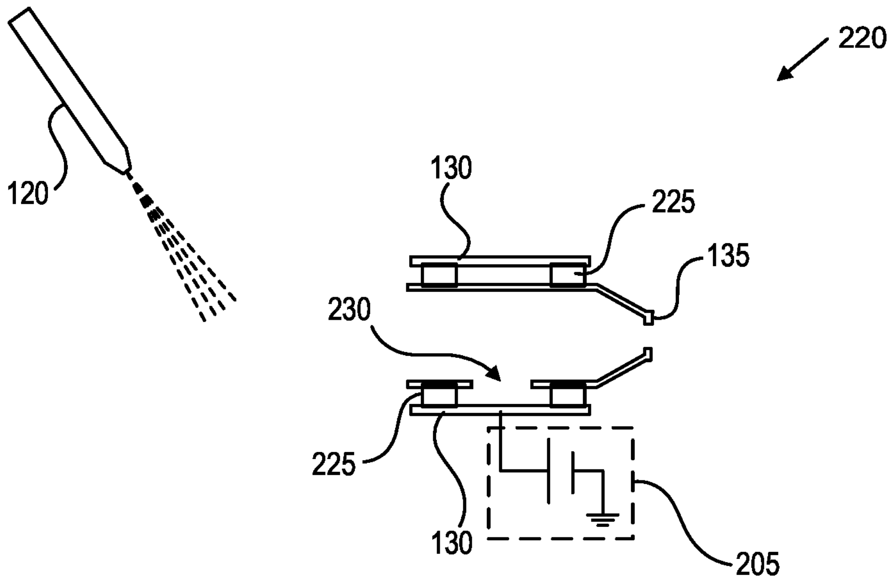
FIG. 2B is a schematic diagram illustrating an example ion separator, in accordance with some embodiments of the present disclosure.

FIG. 2B is a schematic diagram illustrating an example ion separator 220, in accordance with some embodiments of the present disclosure. In some embodiments, ion separation in the gas conduit 125 a gap is introduced between the gas conduit 125 and the active surface 130. To that end, example ion separator 220 includes one or more standoffs 225 disposed between the active surface 130 and the gas conduit 125 and the gas conduit 125 further defines an aperture 230 fluidically coupling the internal volume 210 and the active surface 130. As described in more detail in reference to FIGS. 3B-3C, offsetting the active surface 130 from the internal volume 210 in this way can improve ion separation at least in part by removing a portion of the stream of ions 121 from the entrained flow of ions and can also improve the performance of example ion separator 220 by facilitating maintenance with rapid and simple replacement of the active surface 130 instead of removal of the ion separator 220 itself.

In some embodiments, the active surface is defined by a conductive cylinder (e.g., a metal cylinder, a metal-coated plastic cylinder, a mesh cylinder, etc.) that is mechanically coupled with the gas conduit via the standoff(s) 225. The standoff(s) can be electrically insulating, and can be or include insulating ceramic, polymeric, and/or elastomeric materials. In some embodiments, the standoff(s) 225 permit the internal volume 210 to be fluidically coupled with the source section 150 via the aperture 230. In some embodiments, the standoff(s) 225 can fluidically isolate the active surface 130 from the source section 150, save via the gas conduit 125, thereby preserving a single flow path and reducing the likelihood of bypass flow through the gas conduit 125 into the ion transfer conduit 135 that can negatively affect analysis. In that the ion separators of the present disclosure can be configured for a range of gas velocities (e.g., via the orifice illustrated in FIG. 2B), the development of a bypass flow into the internal volume 210 via the aperture (instead of through the inlet of the gas conduit 125, for example) can impair the separation efficiency of the ion separator 220, for example, by reversing the flow of ions through the aperture 230.

Figure 2C:
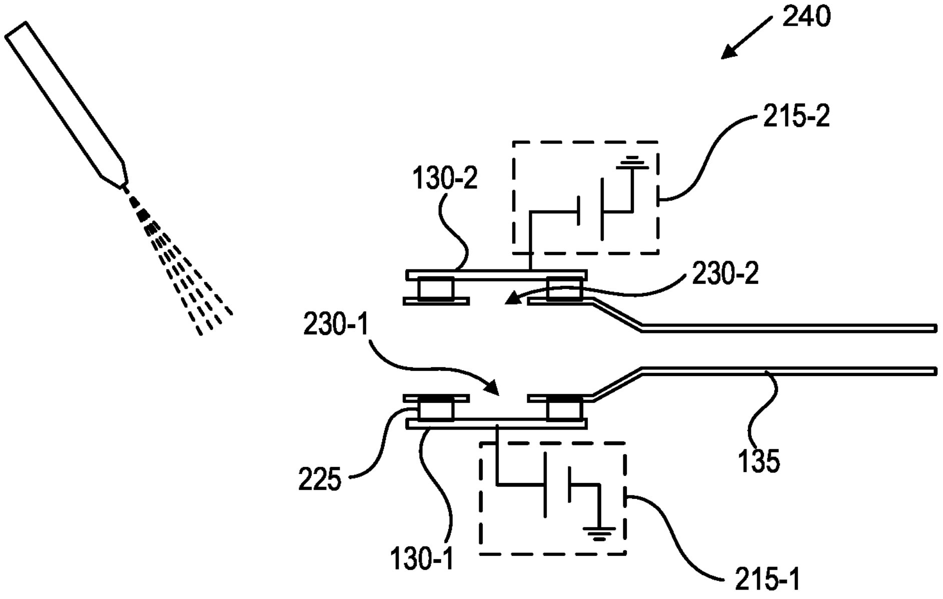
FIG. 2C is a schematic diagram illustrating an example ion separator, in accordance with some embodiments of the present disclosure.

FIG. 2C is a schematic diagram illustrating an example ion separator 240, in accordance with some embodiments of the present disclosure. As an approach to improving separation efficiency, embodiments of the present disclosure include ion separators, such as example ion separator 240, that include multiple active surfaces 130 and/or multiple apertures 230 fluidically coupled with the internal volume 210 of the gas conduit 125. Example ion separator 240 includes a first active surface 130-1 and a second active surface 130-2, fluidically coupled with the internal volume 210 via a first aperture 230-1 and a second aperture 230-2, respectively. Example ion separator 240 also includes first electronic circuitry 215-1 and second electronic circuitry 215-2.

In some embodiments, respective active surfaces 130 can be individually biased to different magnitudes and/or different polarities, as an approach to separating different constituent ions at different places in the flow profile of the entrained ions flowing through the gas conduit 125. In an illustrative example, the ion source 120 can be oriented at a nonzero angle relative to the gas conduit 125 (e.g., not aligned with the flow axis A). To that end, the distribution of ions (e.g., as determined by M/Z ratio) can be non-uniform across the internal volume 210 (e.g., with relatively lighter ions being present in a higher fraction nearer the first aperture 230-1 and relatively heavier ions being present in a higher fraction nearer the second aperture 230-2). In this way, applying a relatively smaller bias to the second active surface 130-2 can permit lighter ions nearer the second aperture 230-2 to be separated without also removing relatively heavier ions from the internal volume 210.

In contrast, a single active surface 130 can be disposed surrounding or at least partially surrounding the gas conduit 125, such that the apertures 230 are each fluidically coupled with a single active surface 130 that, when energized, is biased to a single voltage. In such cases, the regions of the active surface 130 proximal to the apertures 230 can be fluidically isolated from each other. Alternatively, the regions of the active surface 130 proximal to the apertures 230 can be fluidically coupled with each other via a liminal region between the gas conduit 125 and the active surface 130 defined by the standoff(s) 225. In some cases, two apertures 230 are formed in substantially opposing sides of the gas conduit 125. In this way, first electronic circuitry 215-1 and second electronic circuitry 215-2 can be configured to apply a bias of opposite polarity, as an approach to extend the electric field in a parallel alignment across the internal volume 210.

Figure 2D:
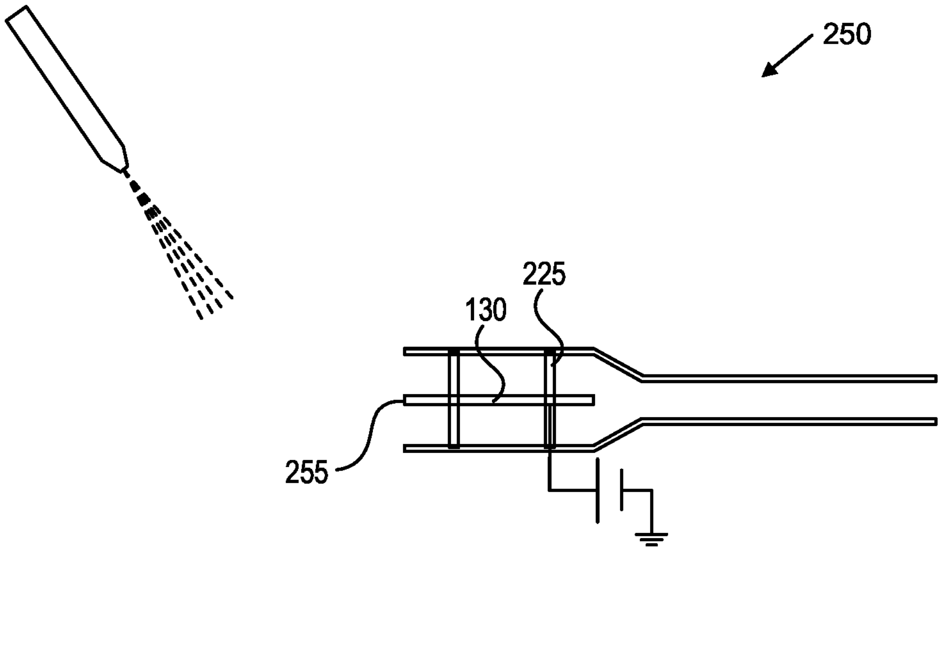
FIG. 2D is a schematic diagram illustrating an example ion separator, in accordance with some embodiments of the present disclosure.

FIG. 2D is a schematic diagram illustrating an example ion separator 250, in accordance with some embodiments of the present disclosure. In contrast to the example ion separators 200, 220, and 240 of FIGS. 2A-2C, example ion separator 250 includes the active surface 130 defined by a conductive element 255 disposed in the internal volume 210. The conductive element 255 can be or include an electrically conductive material (e.g., metal, composite, conductive carbon, etc.) as a solid, film, and/or patterned layer. In some embodiments, the conductive element 255 can be substantially aligned with the flow axis A, and can be electrically coupled with a voltage source via the standoff(s) 225. As an illustrative example, one or more standoffs 225 can include a plenum or other cavity through which an electrical contact can couple the voltage source and the conductive element 255. In example ion separator 250, the standoff(s) 225 can be disposed in the internal volume 210 such that the conductive element 255 is at least partially offset from the gas conduit 125. To that end, the standoff(s) 225 can be annular, or at least partially windowed to permit the passage of ions through the gas conduit 125 into the ion transfer conduit 135.

Figure 3A:
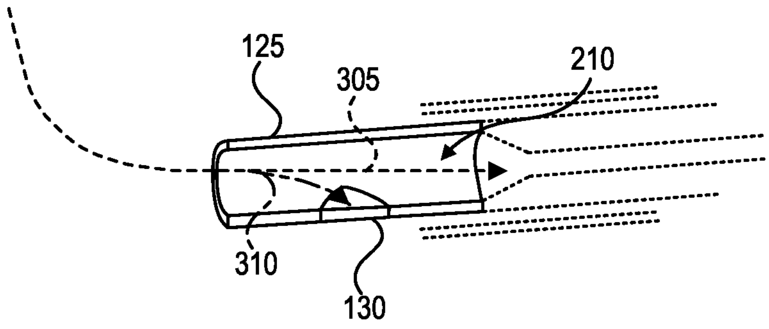
FIG. 3A is a schematic diagram illustrating an example ion separator, in accordance with some embodiments of the present disclosure.

FIG. 3A is a schematic diagram illustrating the example ion separator 200, in accordance with some embodiments of the present disclosure. The simplified diagram in FIG. 3A illustrates two ion flow paths for relatively heavy ions 305 and relatively light ions 310, under the influence of an electric field emanating from the active surface 130. As shown, under the influence of an electric field having strength suitable to separate the light ions 310 from the heavy ions 305, the heavy ions 305 are deflected toward the active surface 130 relatively less than the light ions 310, which can impinge on the active surface 130 and recombine with electrons, adsorb, and/or enter the flow as neutrals that are not detected by the detector module 140.

Figure 3B:
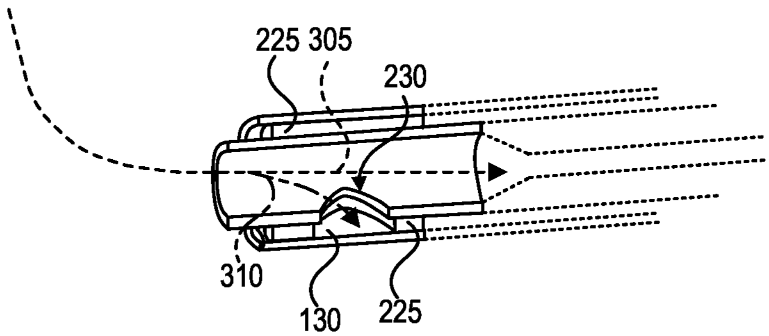
FIG. 3B is a schematic diagram illustrating an example ion separator, in accordance with some embodiments of the present disclosure.

FIG. 3B is a schematic diagram illustrating the example ion separator 220, in accordance with some embodiments of the present disclosure. As described in reference to FIG. 3A, the simplified diagram in FIG. 3B illustrates two ion flow paths for relatively heavy ions 305 and relatively light ions 310, under the influence of an electric field emanating from the active surface 130. As shown, under the influence of an electric field having strength suitable to separate the light ions 310 from the heavy ions 305, the heavy ions 305 are deflected toward the active surface 130 relatively less than the light ions 310, which can impinge on the active surface 130 and recombine with electrons, adsorb, and/or enter the flow as neutrals that are not detected by the detector module 140. In contrast to example ion separator 200, the light ions 310 transit through the aperture 230 and leave the internal volume 210, being no longer entrained in the flow that enters the ion transfer conduit 135.

Figure 3C:
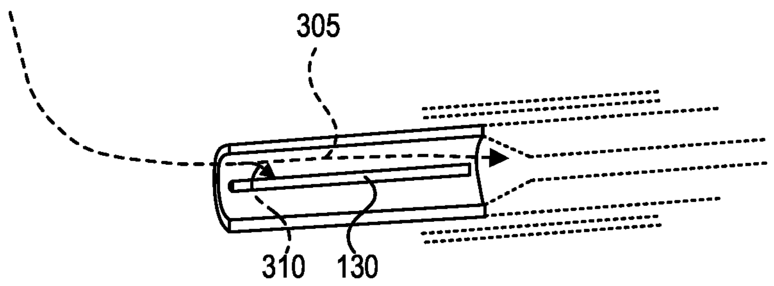
FIG. 3C is a schematic diagram illustrating an example ion separator, in accordance with some embodiments of the present disclosure.

FIG. 3C is a schematic diagram illustrating the example ion separator 250, in accordance with some embodiments of the present disclosure. As described in reference to FIGS. 3A-3B, the simplified diagram in FIG. 3C illustrates two ion flow paths for relatively heavy ions 305 and relatively light ions 310, under the influence of an electric field emanating from the active surface 130. As shown, under the influence of an electric field having strength suitable to separate the light ions 310 from the heavy ions 305, the heavy ions 305 are deflected toward the active surface 130 relatively less than the light ions 310, which can impinge on the active surface 130 and recombine with electrons, adsorb, and/or enter the flow as neutrals that are not detected by the detector module 140. In contrast to example ion separators 200 and 220, the conductive element 255 is exposed to the internal volume 210 along a larger portion of the length of the gas conduit 125. Further, the active surface 130 can be substantially centered in the internal volume 210, making the range of distances over which light ions 310 travel relatively narrow as compared to the ion separators of FIGS. 2A-3B. In this way, a relatively lower magnitude can be used when energizing the active surface 130, and light ions 310 adsorb, recombine with electrons, and/or reenter the entrained flow that enters the ion transfer conduit 135.

The embodiments in FIGS. 2A-3C are intended as exemplary embodiments that can include, omit, and/or reproduce features of each respective example. To that end, example ion separators can include multiple active surfaces 130 disposed as patterned layers onto internal surfaces of the gas conduit 125. Similarly, the conductive element 255 can be disposed in the example ion separator 220 of FIG. 2B. Advantageously, combining various features of the different exemplary embodiments described herein can further improve separation efficiency of light ions 310 from heavy ions 305, based at least in part on exposing the internal volume 210 to larger active surface 130 area, such that equivalent or improved ion separation can be achieved at relatively lower applied voltage.

Example 1: In-Source Ion Separation Using Water-Methanol Solvent

Experimental ion separators were prepared in accordance with some embodiments as described above in reference to FIGS. 1-3C. As described in more detail in reference to FIG. 1, The experimental ion separators were located in front of the ion transfer conduit (e.g., a sampling orifice or capillary) and included a gas conduit characterized by a conductance that is considerably higher than that of the ion transfer conduit. The gas flow thus generated by the pressure gradient, through the internal volume 210 and past the active surface 130, had reduced velocity within the conduit on the order of 10-30 m/s.

The experiments included portions of the gas conduit 125 being biased at a different potential (e.g., the active surface 130) compared to the remaining surface. This was achieved by electrically isolating the active surface 130 from the gas conduit 125 and by applying a separate voltage to it. Alternatively, the differing potential was applied to an outer cylinder, defining the active surface 130, which was electrically isolated from the gas conduit 125, and the field penetration from the outer cylinder occurred through an aperture (e.g., aperture 230) in the gas conduit.

The gas conduit 125 was sealed to the entrance of the ion transfer conduit 135, such that the incoming stream of ions 121 was passed through it, albeit at a lower velocity compared to that in the ion transfer conduit 135. Positive and/or negative potential was applied to the outer cylinder, thereby energizing the active surface. To keep electrospray conditions substantially consistent for different voltage trials, a voltage drop between the ion source 120 and the outer cylinder was maintained substantially steady throughout the experiment by adjusting the tip voltage in coordination with the voltage applied to the active surface 130. The adjustment was achieved by creating a voltage divider and using a single voltage source for both elements, although separate voltage sources can also be used.

Figure 4A:
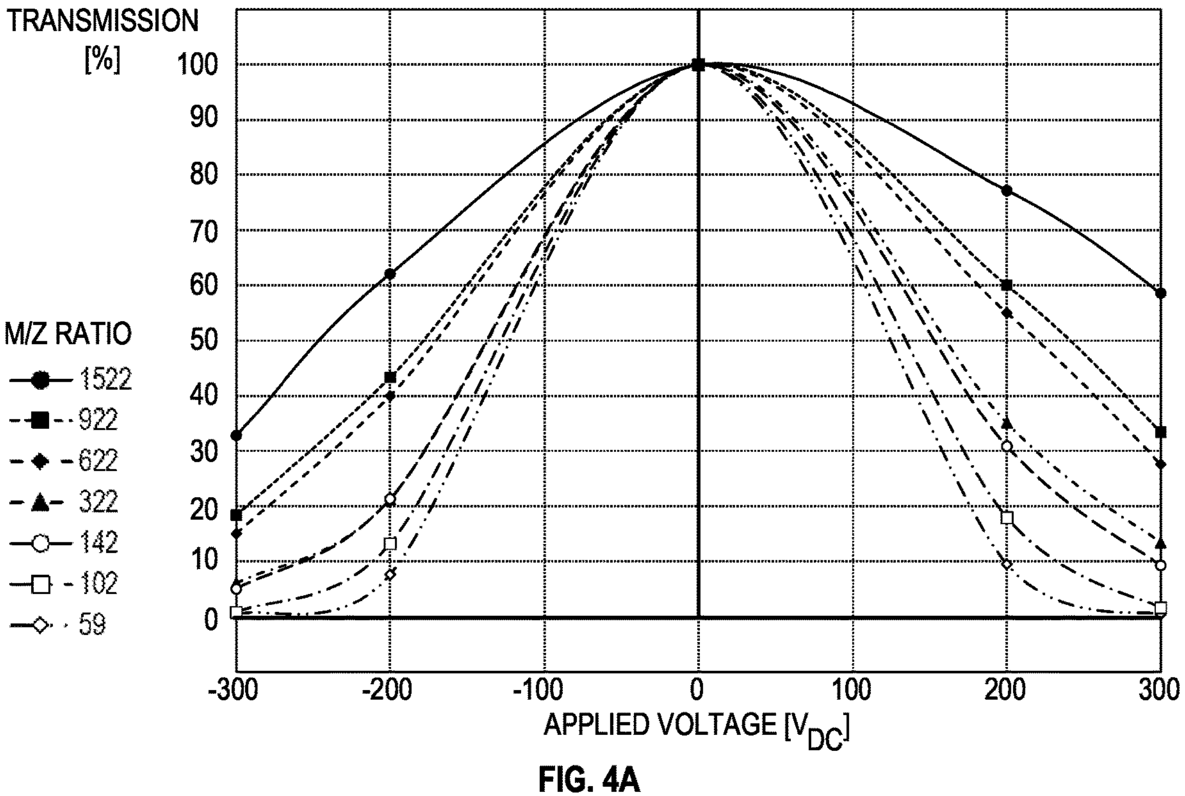
FIG. 4A is a species transmission graph of ion separator performance data, in accordance with some embodiments of the present disclosure.
Figure 4B:
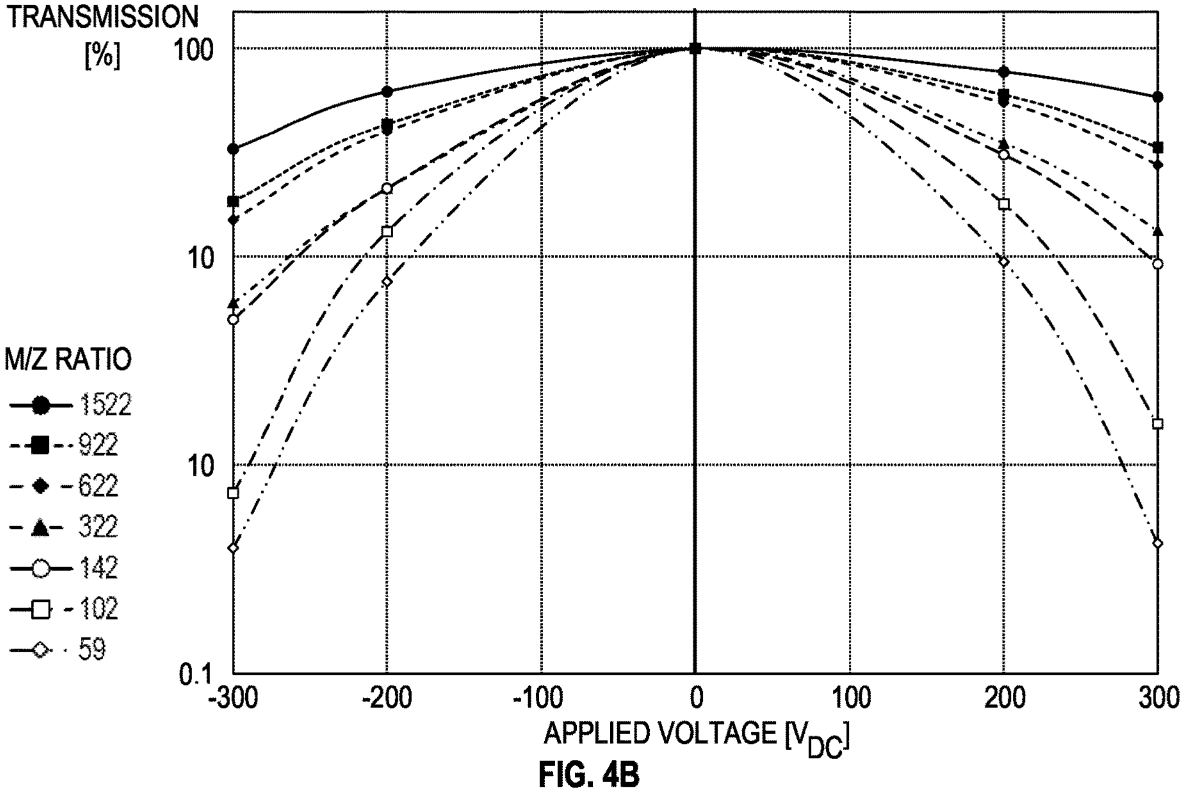
FIG. 4B is a species transmission graph of ion separator performance data, in accordance with some embodiments of the present disclosure.
Figure 4C:
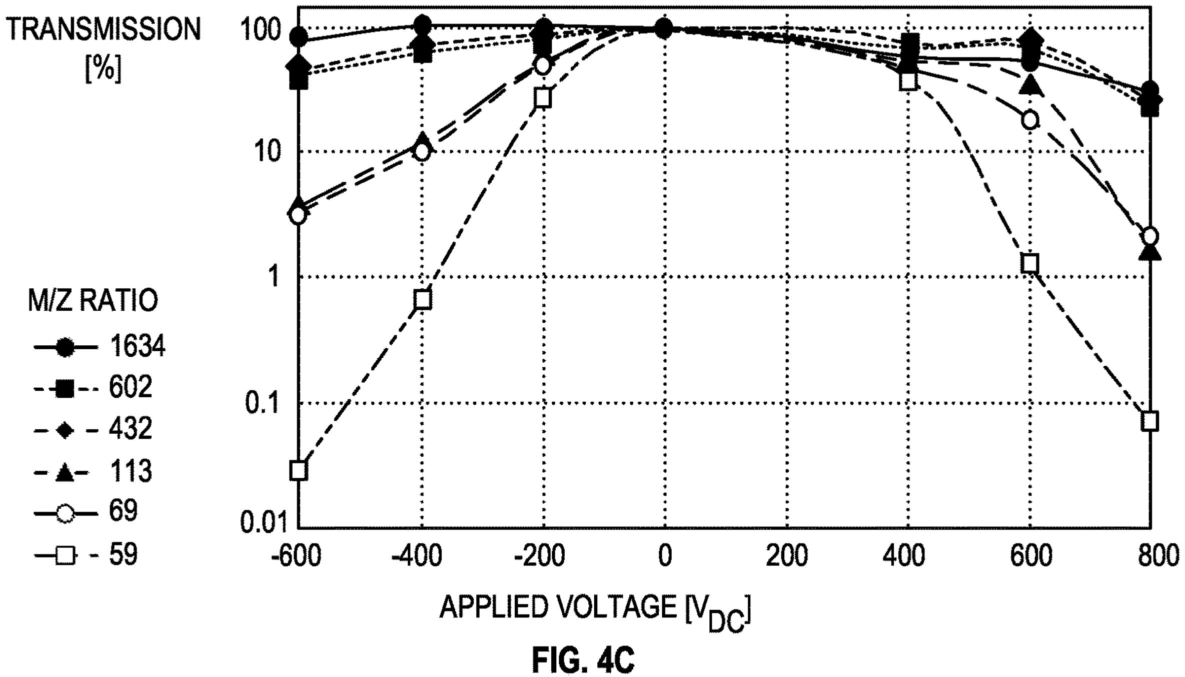
FIG. 4C is a species transmission graph of ion separator performance data, in accordance with some embodiments of the present disclosure.

FIGS. 4A-4C are species transmission graphs of ion separator performance data, generated using the experimental ion separators, in accordance with embodiments of the present disclosure. Each graph shows a plot of transmission of different m/z ions in the sample as a function of the voltage applied to the active surface. Data were collected for light ions (e.g., light ions 310 of FIGS. 3A-3C) and heavy ions (e.g., heavy ions 305 of FIGS. 3A-3C). The ordinate in each graph is a normalized value of "ion transmission" which describes the efficiency of ion filtration relative to an unbiased sample, based on quantification of the number of ions of a given M/Z collected in a mass spectrum, as described in more detail in reference to FIGS. 5A-5B, below. Experimental data reveal that lower m/z ion transmission was significantly reduced at voltage magnitudes greater than 100 V. Advantageously, the data reveal that application of a voltage above 100 V to the active surface 130 has a significant reducing effect on throughput of lighter ions (e.g., M/Z=59, 69, 104, 113, 142, etc.) relative to a smaller impact on heavier ions (e.g., M/Z=622, 922, 1522, etc.). The range of M/Z values for heavier ions addresses ranges that are meaningful for molecules of interest to life-sciences, combustion science, polymer chemistry, and organometallic chemistry, among others.

Figure 5A:
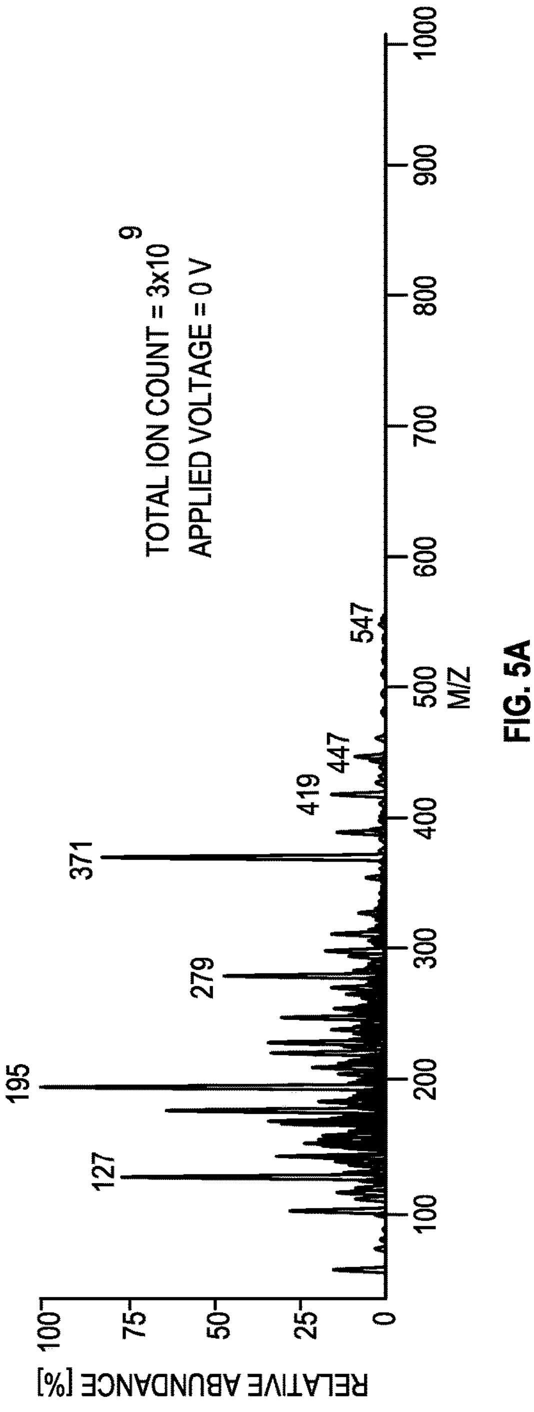
FIG. 5A is a mass spectrum generated using a solvent infusion and without in-source ion separation, in accordance with the current art.
Figure 5B:
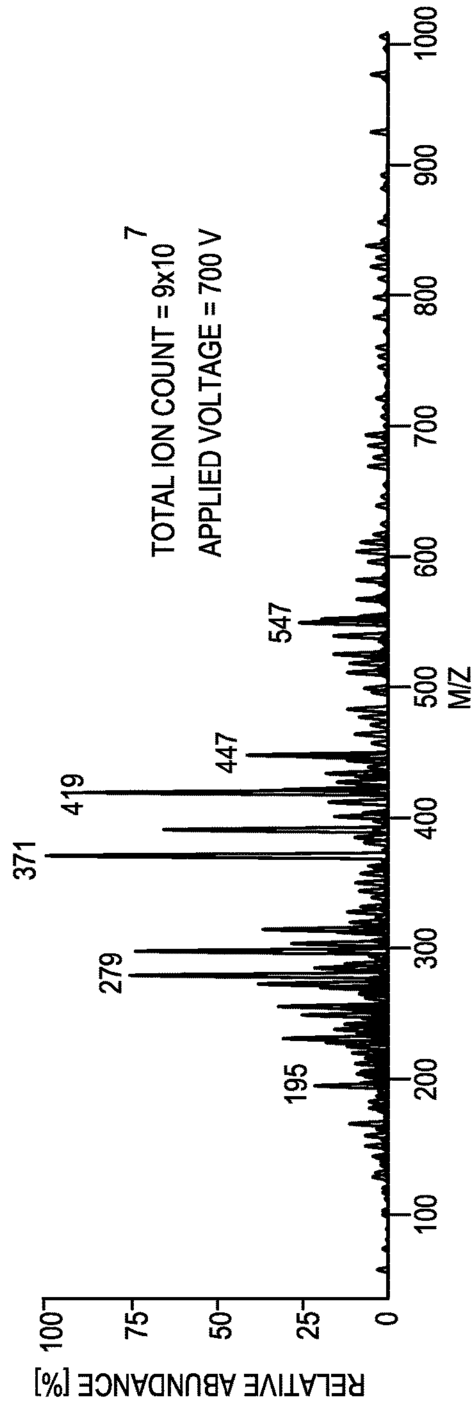
FIG. 5B is a mass spectrum generated using a solvent infusion with in-source ion separation, in accordance with some embodiments of the present disclosure.

FIGS. 5A-5B are mass spectra generated using a solvent infusion with different voltage magnitudes applied to the active surface 130. FIG. 5A is a mass spectrum generated using a water-methanol solvent and several ions of various M/Z values between 100 and 1600, without in-source ion separation. As such, FIG. 5A represents a comparative example, corresponding to the data generated from sample analysis using an ion source of the current art. In contrast, FIG. 5B is a mass spectrum generated using the standard calibration sample of FIG. 4A and an ion separator of FIGS. 2A-3C with in-source ion separation, in accordance with some embodiments of the present disclosure. For simplicity of explanation, the spectra of FIGS. 5A-5B focus on the range of data collected for M/Z from about 100 to about 1000. These data demonstrate that the application of voltage to the active surface 130 reduced the overall ion current and specifically removed light ions from the flow of ions entering the ion transfer conduit 135. The solvent in the example data provided were prepared using infusion of water/methanol solvent, which is representative of many high flow electrospray experiments. The overall total ion count was reduced by more than a factor of 30 at 700V (from about $3\times10^9$ to about 9×107).

In particular, ions having an M/Z ratio below about 200 were significantly reduced from being the most prevalent ions in the sample (M/Z=195), at a relative abundance of 100% (being a value normalized to the signal of the most abundant ion). In experiments with application of a voltage of a magnitude of about 700 V, the most abundant ion shifted to an M/Z=371, with previously minor peaks at M/Z=about 200, about 390, about 419, about 447, and about 547 being emphasized. These data reinforce the findings reported in FIGS. 4A-4C that demonstrate the effectiveness of the ion separators of the present disclosure to selectively remove lighter ions (e.g., having a M/Z value of about 200 or less) from the flow entering the downstream sections 155 and 160 of the analytical instrument.

Figure 6:
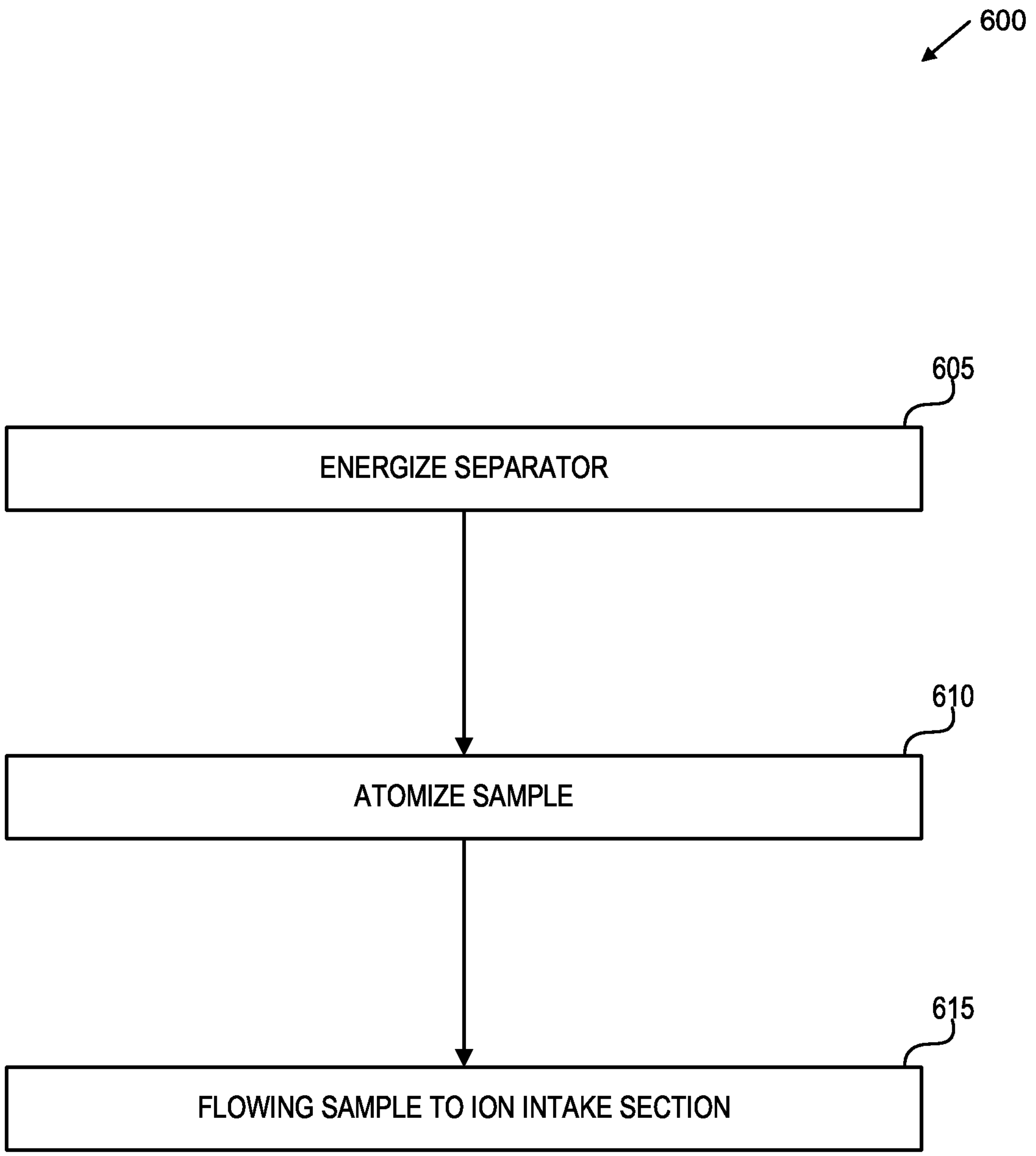
FIG. 6 is a block flow diagram for an example process for generating a chromatic beam of charged particles, in accordance with some embodiments of the present disclosure.

FIG. 6 is a block flow diagram for an example process 600 for in-source ion separation, in accordance with some embodiments of the present disclosure. As described in reference to FIGS. 1-5B, one or more operations making up the example process 600 can be executed and/or initiated by a computer system or other machine operably coupled with components of an analytical instrument (e.g., example MS system 100 of FIG. 1) and/or additional systems or subsystems including, but not limited to, characterization systems, network infrastructure, databases, controllers, relays, power supply systems, and/or user interface devices. To that end, operations can be stored as machine executable instructions in one or more machine readable media that, when executed by the computer system, can cause the computer system to perform at least a portion of the constituent operations of process 600. The constituent operations of process 600 can be preceded by, interspersed with, and/or followed by operation(s) that are omitted from the present description, such as sample preparation, operations that take place in the intermediate section 155 and/or detector section 160, or the like, that form at least a part of an analytical method for processing a sample to generate spectral data as illustrated in FIGS. 5A-5B. To that end, operations of the example process 600 can be omitted, repeated, reordered, and/or replaced in some embodiments.

Example process 600 includes energizing the ion separator (e.g., example ion separator 200, 220, 240, or 250 of FIGS. 2A-2D) at operation 605. As described in more detail in reference to FIGS. 2A-2D, energizing the ion separator can include applying a voltage to the active surface 130, ranging from about 10 V to about 5 kV, with significant reduction in light ion throughput having been observed at voltages as low as 100 V. It is understood, however, that higher voltages permit higher flowrates to be used, with advantages being afforded to analysis latency.

Example process 600 includes atomizing a sample at operation 610. In reference to FIG. 1, atomizing a sample can include passing a sample through an electrospray nozzle (e.g., ion source 120 of FIG. 1) or a nebulizer-plasma source as in ICP-OES systems. In the case of the electrospray nozzle, atomizing the sample can include accelerating a stream of ions (e.g., stream of ions 121 of FIG. 1) toward the gas conduit 125 by biasing the ion source 120 relative to the gas conduit 125 and/or the active surface 130.

Example process 600 includes flowing the sample into the ion transfer conduit 135 at operation 615. Operation 615 can include generating a pressure differential between two or more fluidically coupled sections of an analytical instrument (e.g., example MS system 100 of FIG. 1). For the input section 150 and the intermediate section 155 of FIG. 1, the two sections are fluidically coupled via the ion separator, where the intermediate section 155 is maintained at a relatively lower pressure than the input section 150, thereby inducing a pressure-driven flow that entrains ions and carries the ions toward the detector section 160.

In the preceding description, various embodiments have been described. For purposes of explanation, specific configurations and details have been set forth to provide a thorough understanding of the embodiments. However, it will also be apparent to one skilled in the art that the embodiments may be practiced without the specific details. Furthermore, well-known features may have been omitted or simplified in order not to obscure the embodiment being described. While example embodiments described herein center on ion spectrometry systems, and mass spectrometry systems in particular, these are meant as non-limiting, illustrative embodiments. Embodiments of the present disclosure are not limited to such embodiments, but rather are intended to address analytical instruments systems for which a wide array of material samples can be analyzed to determine, among other aspects, chemical structure, trace element composition, or the like.

Some embodiments of the present disclosure include a system including one or more data processors and/or logic circuits. In some embodiments, the system includes a non-transitory computer readable storage medium containing instructions which, when executed on the one or more data processors, cause the one or more data processors to perform part or all of one or more methods and/or part or all of one or more processes and workflows disclosed herein. Some embodiments of the present disclosure include a computer-program product tangibly embodied in a non-transitory machine-readable storage medium, including instructions configured to cause one or more data processors and/or logic circuits to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the claims. Thus, it should be understood that although the present disclosure includes specific embodiments and optional features, modification and variation of the concepts herein disclosed may be resorted to by those skilled in the art, and that such modifications and variations are considered to be within the scope of the appended claims.

Where terms are used without explicit definition, it is understood that the ordinary meaning of the word is intended, unless a term carries a special and/or specific meaning in the field of charged particle microscopy systems or other relevant fields. The terms "about" or "substantially" are used to indicate a deviation from the stated property within which the deviation has little to no influence of the corresponding function, property, or attribute of the structure being described. In an illustrated example, where a dimensional parameter is described as "substantially equal" to another dimensional parameter, the term "substantially" is intended to reflect that the two parameters being compared can be unequal within a tolerable limit, such as a fabrication tolerance or a confidence interval inherent to the operation of the system. Similarly, where a geometric parameter, such as an alignment or angular orientation, is described as "about" normal, "substantially" normal, or "substantially" parallel, the terms "about" or "substantially" are intended to reflect that the alignment or angular orientation can be different from the exact stated condition (e.g., not exactly normal) within a tolerable limit. In an example, components of the ion separators (e.g., ion separator 200 of FIG. 2A) can can be "substantially aligned" with a flow axis (e.g., flow axis A of FIG. 2A), which can include a deviation from exact alignment resulting from fabrication and/or assembly tolerances that have negligible or no impact on the performance of the ion separator. For dimensional values, such as diameters, lengths, widths, or the like, the term "about" can be understood to describe a deviation from the stated value of up to +10%. For example, a dimension of "about 10 mm" can describe a dimension from 9 mm to 11 mm.

The description provides exemplary embodiments, and is not intended to limit the scope, applicability or configuration of the disclosure. Rather, the ensuing description of the exemplary embodiments will provide those skilled in the art with an enabling description for implementing various embodiments. It is understood that various changes may be made in the function and arrangement of elements without departing from the spirit and scope as set forth in the appended claims. Specific details are given in the description to provide a thorough understanding of the embodiments. However, it will be understood that the embodiments may be practiced without these specific details. For example, specific system components, systems, processes, and other elements of the present disclosure may be shown in schematic diagram form or omitted from illustrations in order not to obscure the embodiments in unnecessary detail. In other instances, well-known circuits, processes, components, structures, and/or techniques may be shown without unnecessary detail.

What is claimed is:

1. An ion separator for in-source ion separation, comprising:

an ion transfer conduit fluidically upstream of and coupled with one or more components of an analytical instrument comprising an ion source, distinct from and fluidically coupled with the ion separator, the ion source being disposed upstream of the separator and configured to deliver a stream of ionized sample material to the ion separator;

a curved gas conduit, fluidically upstream of and coupled with the ion transfer conduit, the gas conduit defining an internal volume, the gas conduit being physically disconnected from and oriented toward the ion source and configured to receive the stream of ionized sample material from the ion source; and electronic circuitry defining a curved active surface exposed to the internal volume, the electronic circuitry being configured to energize the active surface, wherein the active surface is disposed outside the internal volume.

2. The ion separator of claim 1, further comprising a standoff, disposed between the active surface and the gas conduit, wherein at least part of the electronic circuitry is coupled with the gas conduit via the standoff, and wherein the gas conduit defines an aperture fluidically coupling the internal volume with the active surface via the aperture.

3. The ion separator of claim 2, wherein the aperture is a first aperture, wherein the first aperture is proximal to a first region of the active surface, and wherein the gas conduit defines a second aperture fluidically coupling the internal volume with a second region of the active surface.

4. The ion separator of claim 3, wherein the first aperture and the second aperture are formed in opposing sides of the gas conduit.

5. The ion separator of claim 1, wherein the active surface is a first active surface, and wherein the electronic circuitry defines a second active surface disposed in or on the internal surface of the gas conduit.

6. The ion separator of claim 1, wherein the electronic circuitry is configured to energize the active surface to a voltage having a magnitude from about 10 V to about 1000 V.

7. The ion separator of claim 1, wherein the gas conduit is characterized by a higher gas conductance relative to the ion transfer conduit.

8. The ion separator of claim 1, wherein the ion separator is configured to generate a gas velocity through the gas conduit from about 1 m/s to about 50 m/s.

9. The ion separator of claim 1, wherein the gas conduit opens onto a first environment configured to operate at a first pressure, and wherein the ion transfer conduit opens onto a second environment configured to operate at a second pressure lower than the first pressure, the second environment being fluidically coupled with the first environment via the gas conduit and the ion transfer conduit.

10. An analytical instrument, comprising:

an ion source configured to generate a stream of ionized sample material;

a curved gas conduit, physically disconnected from and fluidically coupled with the ion source, the gas conduit being oriented to receive the stream of ionized sample material from the ion source, the gas conduit defining an internal volume;

electronic circuitry defining a curved active surface exposed to the internal volume, the electronic circuitry being configured to energize the active surface, wherein the active surface is disposed outside the internal volume;

an ion transfer conduit downstream of and fluidically coupled with the ion source via the gas conduit; and one or more components of the analytical instrument configured to receive ions of the stream of ionized sample material and to generate spectrometric data characteristic of the ionized sample material.

11. The analytical instrument of claim 10, further comprising a standoff, disposed between the active surface and the gas conduit, wherein at least part of the electronic circuitry is coupled with the gas conduit via the standoff, and wherein the gas conduit defines an aperture fluidically coupling the internal volume with the active surface via the aperture.

12. The analytical instrument of claim 10, wherein the electronic circuitry is configured to energize the active surface to a voltage having a magnitude from about 10 V to about 1000 V.

13. The analytical instrument of claim 10, wherein the electronic circuitry comprises a shared voltage source electronically coupled with the active surface and with the ion source.

14. The analytical instrument of claim 10, wherein:

the ion source and the gas conduit are disposed in a first environment;

the ion transfer conduit is disposed in a second environment;

the analytical instrument is configured to maintain a first pressure of the first environment substantially equal to atmospheric pressure; and the analytical instrument is configured to maintain a second pressure of the second environment lower than the first pressure.

15. The analytical instrument of claim 10, configured to generate a gas velocity through the gas conduit from about 1 m/s to about 50 m/s.

16. The ion separator of claim 2, wherein the aperture is formed through a material portion of the gas conduit, and wherein the active surface is coupled with material portion via the standoff.

17. The analytical instrument of claim 11, wherein the aperture is formed through a material portion of the gas conduit, and wherein the active surface is coupled with material portion via the standoff.

* * * * *